Figure 1:
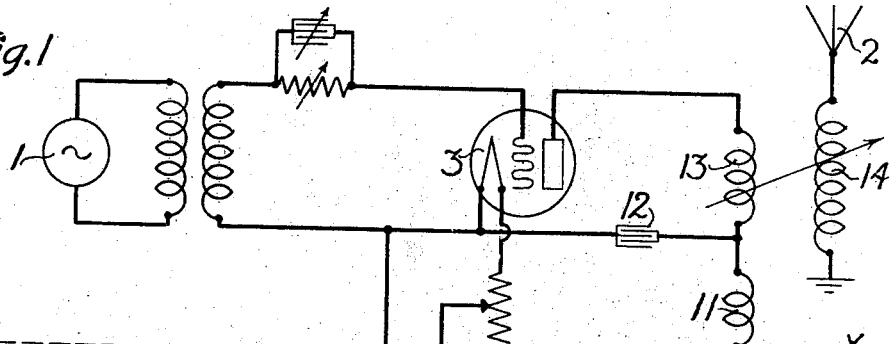

Dec. 18, 1923.

E. L. NELSON 1,478,050

MODULATION CIRCUITS AND MEASUREMENT

Filed April 26, 1922    2 Sheets-Sheet 1

Inventor:
Edward L. Nelson.
by E.W. Griggs   Atty

Dec. 18, 1923.  
E. L. NELSON  
1,478,050  
MODULATION CIRCUITS AND MEASUREMENT  
Filed April 26, 1922  
2 Sheets-Sheet 2

Inventor:  
Edward L. Nelson.  
by E.W.Griggs Att'y

Patented Dec. 18, 1923.

1,478,050

UNITED STATES PATENT OFFICE.

EDWARD L. NELSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

MODULATION CIRCUITS AND MEASUREMENT.

Application filed August 26, 1922. Serial No. 584,393.

*To all whom it may concern:*

Be it known that I, EDWARD L. NELSON, a citizen of the United States, residing at East Orange, in the county of Essex, State of New Jersey, have invented certain new and useful Improvements in Modulation Circuits and Measurements, of which the following is a full, clear, concise, and exact description.

This invention relates to modulation of carrier waves and more particularly to arrangements for indicating the degree of completeness of modulation in modulation circuits for radio transmission or similar purposes.

Heretofore the oscillograph has been commonly used to indicate completeness of modulation in modulating and transmitting circuits. The oscillograph is a comparatively expensive instrument which requires skilled attendance and usually requires readjustment every time it is to be used. Furthermore, it is hard to correctly estimate small differences in percentage of modulation on the oscillograph. The instrument is not adapted to field work or hard usage such as commercial radio sets are often required to undergo.

The present invention, in one of its many possible forms, a few of which are described herein, avoids many of the objectionable features of the oscillograph and moreover has special advantages of its own. A continuous reading of the percentage of modulation may be made, if desired, and the input energy of the modulating or signaling frequency wave may be readjusted from time to time in order to maintain the best operating conditions and hold the percentage of modulation at a desired point.

The principles upon which the invention is based, as applied to radio transmission systems, is that of measuring the speech energy supplied to a high frequency wave modifying device separately from any direct or high frequency current components.

An ordinary hot-wire alternating current ammeter or other indicating arrangement adapted to respond to voice frequency or other signal frequency currents is arranged in the modulating circuit in such a manner as to give the desired indication. The meter may be directly calibrated in percentage of modulation, although in general the calibration for one circuit will not apply to other circuits having circuit elements of materially different constants.

The invention may be embodied in a variety of modulation circuits but is especially adapted for use in connection with the class of plate circuit modulators. One such circuit which is widely known and in common use is called the "constant current modulation system." Such a system consists essentially of two vacuum tubes (or two groups of tubes) to one of which is supplied high frequency oscillations to be modulated, and to the other of which is supplied low frequency modulating currents, the two tubes having a common space current supply source in series with which is a constant current choke coil of high inductance which tends to keep constant the sum of the currents supplied to the two tubes. In applying the modulation indicating arrangement of the present invention to such a circuit, a slight modification is made. Separate high inductance coils are provided, one for each vacuum tube circuit. The terminals of these coils which are electrically adjacent to the anodes of the tubes are connected by a circuit containing a condenser of sufficient capacity to act as a low impedance to speech frequency alternating currents. In series with the condenser the modulation indicating meter is placed.

In other arrangements the modulation indicating meter is placed in the secondary circuit of a speech frequency transformer. The primary of this transformer may be located in series with the condenser as in the arrangement described in the preceding paragraph, or the primary may be directly included in series with the anode circuit of the modulating vacuum tube. The results secured with these various arrangements are generally similar and choice of which one is to be used is largely a matter of convenience.

The broad principle upon which the invention is based is, therefore, that of indicating modulation by measuring some current variation of the modulating frequency in some portion of the system.

Figure 5:
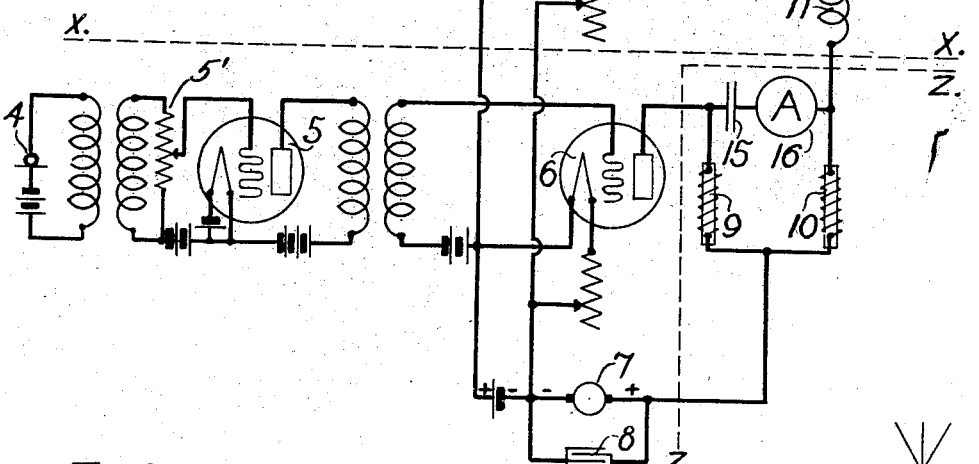
Figure 3:
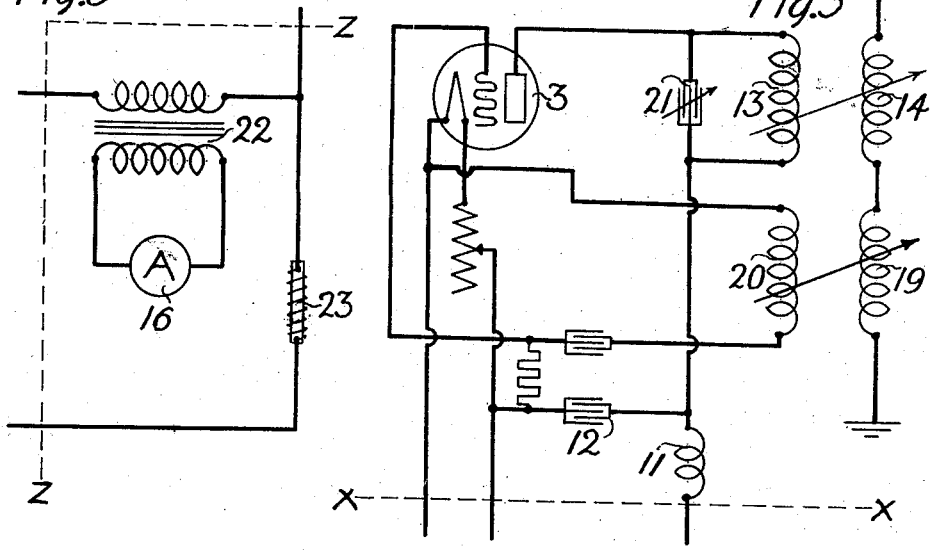
Figure 2:
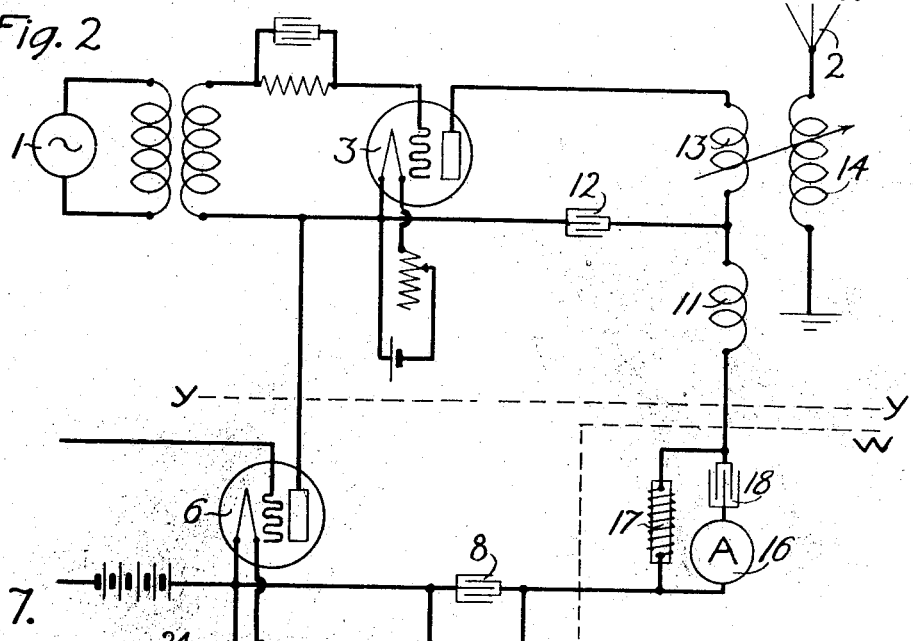
Figure 7:
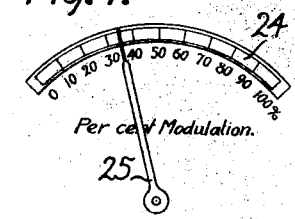
Figure 6:
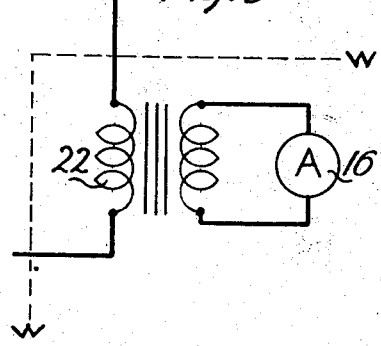
Figure 4:
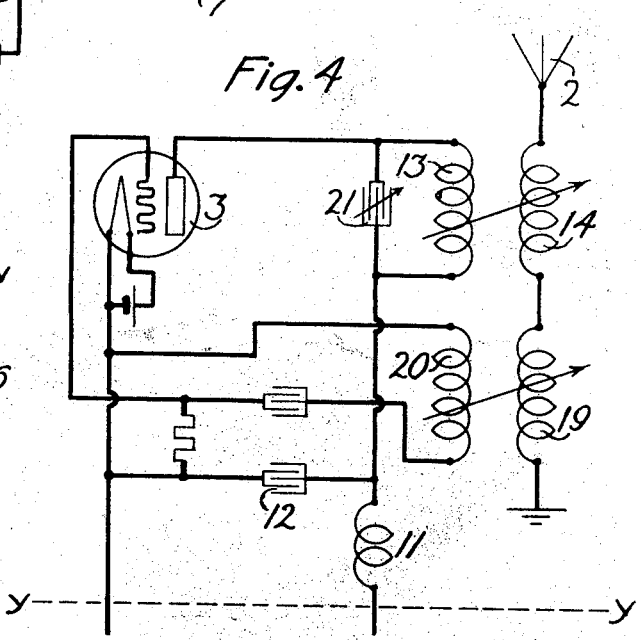

The invention is hereinafter more particularly described in connection with the accompanying drawings wherein Fig. 1 is a circuit diagram of a constant current modulating system having the modulation indicating meter connected in circuit therewith; Fig. 2 is a circuit diagram of a series type modulating circuit with the modulation indicating meter connected in circuit therewith, the speech input apparatus being omitted; Figs. 3 and 4 are modifications of Figs. 1 and 2 respectively, wherein a self modulating oscillator is substituted for an amplifying modulator supplied by a separate source of oscillations; Figs. 5 and 6 illustrate alternative arrangements for connecting the modulation meter to the circuit arrangement of Figs. 1 and 2 respectively, by means of a suitable current transformer; and Fig. 7 is a diagram indicating the manner of calibrating the thermo-ammeter to indicate percentage of modulation.

In Fig. 1 the source 1 indicates an oscillator generator of the well-known vacuum tube type, or any other convenient source for supplying high frequency oscillations to be amplified, modulated and radiated from a radiating conductor 2. The modulating action occurs in the amplifying and modulating tube 3. The tube 3 may, of course, be replaced by any suitable number of tubes connected in parallel. The circuit 4 indicates a telephone line or other circuit for supplying oscillations with which the high frequency oscillations from the source 1 are to be modulated. The current waves from the circuit 4 will in general be amplified in the amplifier 5 having a gain or amplification control adjusting means. The gain control means indicated in the present instance consists of a potentiometer 5' connected across the input circuit of the amplifier, this being a method of amplification or gain control in common use. The amplified waves from the output circuit of the amplifier 5 are impressed upon the input or grid circuit of the vacuum tube 6, which as in the case of the vacuum tube 3, may be replaced by a system of tubes in parallel. The function of the vacuum tube 6 is essentially that of a variable impedance device inasmuch as the impedance of its anode-cathode circuit or path varies in accordance with the potential impressed upon the grid by the waves transferred through the amplifier 5.

The tubes 3 and 6 are supplied with space current from any suitable source of supply, represented in the present instance as a direct current generator 7 shunted by a suitable condenser 8 which smooths out commutator fluctuations in the current supplied from the generator 7. An inductance coil 9 is in circuit with the anode-cathode path of the tube 6 and an inductance coil 10 in circuit with the anode-cathode path of the tube 3. The coils 9 and 10 have such high values of inductances as to offer a high impedance to currents of speech or modulating frequencies. Coil 11 is a high frequency choke coil adapted to prevent passage of high frequency currents and the condenser 12 is of such capacity as to readily pass high frequency currents, but practically prevent the passage of speech or modulating frequency currents. Coil 13 is coupled to the antenna coil 14 to impress upon the antenna circuit the amplified and modulated high frequency waves. Condenser 15 is of such capacity as to be of low impedance to alternating currents of speech or modulating frequencies. For apparatus intended for communication by radio telephony over a range of about 50 or 100 miles, it has been found desirable to use a condenser 15 having a capacity of about 4 microfarads. The modulation meter 16 is included in series with the condenser 15. An instrument suitable for this purpose is a thermo-ammeter. The reading of the instrument, when located in a circuit as described, is proportional to the speech frequency output of the tube 6 and, therefore, indicates very nearly the percentage of modulation. Instruments other than a modulation meter serve to indicate when the high frequency output is of a proper value and, therefore, enable one to tell when the high frequency portion of the circuit is working properly. Under such conditions any difficulty producing insufficient modulation almost always arises in the low frequency portion of the circuit. Any instrument which thus correctly indicates the speech frequency energy directly supplied to the wave modifying tube serves as a modulation meter. With a certain set of circuit constants, however, it will first be necessary to calibrate the meter by observing the percentage of modulation in an oscillograph or other instrument, or measuring the direct current component supplied to the tube 3 through the coil 11 and by comparing it with the indication of the meter 16, compute the percentage of modulation with various readings of the meter 16, or in some other way.

The meter may be calibrated by measurement of the modulated high frequency wave. In an arrangement which has been used for this purpose to measure the percentage of modulation of a high frequency wave of a wave length of about 350 to 400 meters modulated with audible frequencies, a heated filament vacuum tube rectifier is connected in series with a 5000 ohm resistance. A high frequency transformer consists of 20 or 30 turns in the input circuit of the rectifier coupled to 1 or 2 turns in the antenna. The circuit through the rectifier is from the anode, through the high side of the transformer and the 5000 ohm resistance to a terminal of the filter hereinafter mentioned. The other terminal of the filter is connected to the cathode. The rectified current is passed through a several section low pass filter comprising series coils of 1 millihenry inductance in each section and shunt capacities of 10000 micro-micro-farad capacity.

The filter is terminated by 5000 micro-micro-farad shunt capacities. The output side of the filter is connected to a milliammeter placed in series with a two-henry inductance coil. In parallel with this meter and coil is connected a thermo-ammeter in series with a 24 micro-farad capacity. The milliammeter will measure the direct current component of the rectified wave and the thermo-ammeter the superimposed alternating current component. From the relative values of these currents, the percentage of modulation may be computed when the wave form of the modulating wave is known within the required degree of approximation. The rectifier, the filter, and the meters must be completely shielded from high frequency currents by a grounded shield. In this way the only high frequency input is through the secondary of the high frequency input transformer.

When the meter 16 is once calibrated in percentage of modulation, it will thereafter give a good indication of what the percentage of modulation is at any particular instant. The frequency of the oscillator 1 may be changed over a relatively wide range without disturbing the correctness of the calibration. It is not, however, essential to calibrate the meter 16 in this manner since it will ordinarily be sufficient to make a few readings and observe, for example, that a reading of 4 on the scale of the meter corresponds to 50 per cent modulation, that a reading of 6 corresponds to 75 per cent modulation and so on. The operator or attendant will thus be able to observe the meter 16 and adjust the gain control of the amplifier 5 to give any desired completeness of modulation. By this adjustment waves of small amplitude incoming from the line 4 may be amplified more so that they will produce as complete modulation as waves of large amplitude, the modulation meter being used as a guide.

In the operation of the system, it will be observed that the direct current component of the plate current of the tubes 3 and 6 is supplied through the choke coils 9 and 10. The speech frequency component from the tube 6 is impressed upon the plate circuit of the tube 3 through the capacity 15 and the meter 16 measures the effective value of the speech frequency component. Since, other things being equal, the completeness of modulation of the outgoing waves is proportional to the amplitude of the speech frequency component impressed upon the plate circuit of the tube 3, the reading of the meter 16 will be proportional to the percentage of modulation.

In the series or "constant potential" modulation circuit of Fig. 2, the elements 1, 2, 3, 11, 12, 13 and 14 correspond to and function in the same manner as the correspondingly identified elements of Fig. 1. The speech frequency input circuit consisting of the elements 4, 5 and 5' of Fig. 1 is omitted but is understood to be the same as in Fig. 1. The source 7 which supplies plate current to the tubes 3 and 6 is in series with the anode-cathode paths of both tubes. Speech frequency variations applied to the input circuit of the tube 6, therefore, cause corresponding variations in its anode-cathode impedance and corresponding changes in voltage across the anode-cathode of the tube 3 result. This causes the high frequency waves from the oscillator 1 to be modulated in the output circuit of tube 3. A speech frequency choke coil 17 is placed in series with the anode-cathode circuits of the tubes 3 and 6. A condenser 18 having a capacity about the same as that of the condenser 15 of Fig. 1 is shunted around the coil 17 and the modulation indicating meter 16 is placed in series with the condenser. The direct current component of the space current flows through the coil 17, but the speech frequency component passes through the meter 16 and the condenser 18. The high frequency choke coil 11 serves to prevent high frequency waves from passing through the elements 17 or 18 or through the circuit of the tube 6.

The operation of the circuit and the operation of the meter 16 in indicating the percentage of modulation will be understood by reference to the description of the operation of the circuit of Fig. 1 without further discussion.

Fig. 3 illustrates a vacuum tube oscillator circuit which may be substituted for that portion of the circuit of Fig. 1 above the line X—X. The vacuum tube 3 in this arrangement, instead of being supplied by oscillations from a separate source, generates its own oscillations and modulates them. This oscillator circuit is of a well-known type and, therefore, needs but a brief description. Its plate circuit is coupled to the antenna 2 by the coupling between the coils 13 and 14. Its grid or input circuit is also coupled to the antenna circuit by the coupling between the coils 19 and 20. The antenna circuit is tuned and the generated frequency will correspond approximately to the resonant frequency of the antenna circuit. A variable capacity 21 serves to adjust the phase of the oscillation in the plate circuit with respect to the oscillations in the antenna. Capacity 21, when properly adjusted, also assists in preventing parasitic or undesired oscillations.

Fig. 4 represents an oscillation circuit which may be substituted for that portion of the circuit of Fig. 2 above the line Y—Y. The operation of this circuit will be understood from a consideration of the description of Fig. 3, the elements of the circuits being correspondingly numbered. The invention is equally applicable to other oscillatory circuits.

Fig. 5 indicates elements which may be substituted for that portion of the circuit of Fig. 1 which is cut off by the line Z—Z. In the arrangement of Fig. 5 a transformer 22 is substituted for the capacity 15 and the coil 9. The choke coil 23 is of high inductance and is common to the plate circuits of both of the tubes 3 and 6 which are connected in parallel with respect to the coil 23. The meter 16 is connected in the secondary circuit of the transformer 22 and serves to indicate the effective value of the speech frequency current supplied to the tube 3 by the tube 6. As an alternative to Fig. 5 the transformer 22 might have its primary in series with the coil 11.

Fig. 6 indicates an arrangement which may be substituted for that part of the circuit of Fig. 2 which is cut off by the line W—W. The transformer 22 is adapted to transform speech frequencies as in the case of Fig. 5 and has its primary connected directly in series with the anode circuits of the tubes. The meter 16 is connected in the secondary circuit as in the case of Fig. 5.

In addition to the arrangements of Figs. 5 and 6, the transformer 22 may be connected in the place of the modulation indicating meter in Figs. 1 and 2, the meter being placed in the secondary circuit of the transformer. The results obtained with these modified arrangements are in general similar to those obtained by using the meter in series with the capacities 15 and 18 as described in connection with Figs. 1 and 2. In general the arrangements of Figs. 1 and 2 are more convenient on account of the difficulty of providing for the relatively large direct current component. Those skilled in the art will observe that there are numerous other possible modes of connecting up the modulation meter all of which will involve the same general principles of operation.

Fig. 7 is a diagrammatic indication of the preferred method of calibrating the meter 16. A scale 24 is graduated in percentages of modulation. The indicating needle 25 of the instrument moves over this scale. In general, in the case of telephony, the needle will swing over the scale at syllable frequency. In using the invention, the average position about which the needle tends to oscillate is the percentage of modulation of the high frequency waves at that time. It is well understood among workers in the art that the percentage of modulation in the case of radio telephony is not constant, but varies continually as the various spoken sounds of voice vary. In regulating the input by means of the gain control device of the amplifier 5, it is not attempted to change the amplification for individual phrases or sentences, but only to change the amplification to fit different voices or to accommodate the volume of speech energy coming in through a telephone exchange or over various lines of diverse lengths to the radio system so that effective modulation may always be taking place.

Although described in connection with a radio telephone transmission system, the principles of the invention are applicable to other radio systems, for example, for control of mechanism at a distance as well as to systems for signaling by transmitting modulated energy over lines. The most simple manner of adapting the invention to a line wire system is to substitute a conductive line circuit for the antenna circuit of Figs. 3 and 4.

Having described various forms of the invention the novel features believed to be inherent therein are set forth in the appended claims.

What is claimed is:

1. In a modulating system, a source of carrier waves, a source of modulating waves and a device having an indicator moving over a calibrated scale, said device being responsive to current intensities and included in circuit with said sources to indicate the degree of modulation.

2. In a system in accordance with claim 1, regulating means for adjusting the degree of modulation.

3. In a modulating system, a measuring instrument responsive to current intensity of the frequency at which modulation is taking place for indicating the completeness of modulation in combination with means for preventing direct current or currents of other frequencies than the modulation frequency from acting on the device.

4. In a modulating system wherein modulation is effected by current variations superimposed upon direct current supplied to a device for varying high frequency waves, the combination of means for isolating from other currents the current corresponding to the current variations and means for continually indicating the value of the energy of the current so isolated.

5. In a modulating system, a closed path conductive to modulating frequency current and including a high frequency discharge device, a low frequency discharge device and a modulation indicating device.

6. In a system in accordance with claim 5, a path of high impedance to modulating frequencies and low impedance to direct current in shunt to the modulation indicating device as viewed from either of said discharge devices.

7. A constant current modulating system comprising a source of electrical energy for supplying space currents, parallel paths from one terminal of said source to the other terminal thereof, each of said paths including impedance means of high impedance to modulating frequencies and a discharge device, means for varying the impedance of one of said discharge devices at a high frequency rate and the impedance of the other at a modulating frequency rate, and a path of low impedance connecting the terminals of said high impedance means electrically adjacent to said discharge devices, said low impedance means having in series therewith a modulation indicating meter.

8. In a modulating system, a closed circuit including a discharge device of which the impedance varies at a high frequency, and a discharge device of which the impedance varies at a low frequency in combination with current supply means for said devices, and a modulation indicating meter coupled to the closed circuit to indicate the low frequency current flowing in the closed circuit.

9. A modulating system comprising a source of electrical energy for supplying space current, a variable impedance device supplied by said source through a choke coil having a high impedance to current variations of audible frequency and a device of which the impedance varies at a carrier frequency also supplied from said source through a choke coil of high impedance to current variations of audible frequency.

10. A radio transmitting circuit comprising an incoming low frequency line, a repeater including a gain control device connecting said line to a variable impedance device, a source of high frequency oscillations, a device for amplifying oscillations from said source, said last mentioned device and said variable impedance device being supplied with current from a common current supply source, impedance means of high inductance for maintaining constant the sum of the currents supplied from said source to said devices, and an indicating instrument to indicate the energy represented by current variations of audible frequency supplied from said variable impedance device to said other device.

In witness whereof, I hereunto subscribe my name this 23rd day of August A. D. 1922.

EDWARD L. NELSON.